United States Patent [19]
Imaseki

[11] 3,913,017
[45] Oct. 14, 1975

[54] CHANNEL SWITCHING DEVICE FOR MOBILE RADIO COMMUNICATION EQUIPMENT

[75] Inventor: Kazuo Imaseki, Tokyo, Japan

[73] Assignee: Nippon Electric Company, Limited, Tokyo, Japan

[22] Filed: Mar. 28, 1974

[21] Appl. No.: 455,836

[30] Foreign Application Priority Data

Mar. 28, 1973 Japan ............................ 48-36024

[52] U.S. Cl. .................... 325/52; 179/41; 340/172; 343/200

[51] Int. Cl.[2] ........................................ H04B 1/10

[58] Field of Search ............................. 325/18–21, 325/16, 25, 52, 64, 56, 301–307, 312–314, 333–335, 464, 51, 53, 54; 340/147 A, 147 B, 147 C, 147 F, 147 G, 147 LP, 150, 182, 184, 412, 171; 343/200, 201, 205; 179/41 A

[56] References Cited

UNITED STATES PATENTS

| | | | |
|---|---|---|---|
| 3,582,787 | 6/1971 | Muller | 325/53 |
| 3,824,475 | 7/1974 | Pflasterer | 325/470 |

*Primary Examiner*—Robert L. Griffin
*Assistant Examiner*—Robert Hearn
*Attorney, Agent, or Firm*—Sughrue, Rothwell, Mion, Zinn & Macpeak

[57] ABSTRACT

A channel switching device for use in a mobile radio communication system is disclosed. The device is intended for use in systems wherein the service area is divided into a plurality of zones each having a fixed base station and each accommodating a plurality of mobile stations. The base stations have a plurality of frequency-divided communication channels exclusively assigned to them. The mobile stations are provided with a detector and a switching circuit which are responsive to the received signal to controllably switch between channels. When the received signal exceeds a predetermined threshold, only the channels assigned to the zone in which the mobile station is located are selectively switched or scanned. On the other hand, when the received signal falls below the threshold, all the channels in the service area are scanned.

2 Claims, 2 Drawing Figures

CHANNEL SWITCHING DEVICE FOR MOBILE RADIO COMMUNICATION EQUIPMENT

BACKGROUND OF THE INVENTION

1. Field of the Invention

The present invention generally relates to radio communications systems and, more particularly, to a channel switching device for mobile station equipment in a mobile radio communication system.

2. Description of the Prior Art

Generally, it is difficult to provide mobile radio service for a large area with only a single base station covering a number of vehicles which are in motion. In order to meet the demand of such a mobile radio communication service, a mobile radio communication system has been proposed in which the entire service area is divided into a plurality of zones each having a fixed station with a relatively small number of radio carrier frequencies or channels In such Insuch a case, each mobile station has the function of selecting the unoccupied carrier wave channel out of the carrier wave channels alloted to the zone. To secure the optimum communication quality, the mobile radio unit should establish the communication channel through one of the carrier frequencies allocated to the zone in which the vehicle is located. The sequential scanning of all channels, including the channels assigned to other zones, takes a considerably long period of time. Furthermore, those channels assigned to other zones are not suited for establishing a communication channel of an acceptable quality, even though they are selected as a result of the extensive scanning. In any event, the time needed for establishing a communication channel tends to be prolonged. Furthermore, in some cases, a particular carrier wave frequency which has been received from other zones may be selected as a carrier wave. In such a case, the selected carrier wave fails to secure a reliable communication channel, even though there are several other carrier wave frequencies of higher quality.

SUMMARY OF THE INVENTION

Accordingly, it is an object of the present invention to provide a channel switching device for mobile radio equipment which can eliminate the possibility of receiving signals on channels from other zones and, at the same time, appreciably reduce the hunting period, i.e., selecting period.

In the mobile radio communication system of the invention having the entire service area divided into a plurality of zones, each mobile radio unit is capable of automatically channel-switching only a small number of those channels from a plurality of channels particular to each mobile unit which are allocated according to the zone grouping. The mobile unit monitors whether the signal-to-noise ratio (S/N), or the input carrier level, of a signal received from the fixed station is higher than a predetermined value set higher than the lowest acceptable value for the channel connection and, as long as the detected signal-to-noise ratio remains higher than the predetermined value, the hunting and selecting operation is performed within the plurality of frequency channels allotted to that particular zone. The predetermined value of the signal-to-noise ratio is set at a value so selected that no two adjacent regions may overlap each other as represented in a particular region bounded by an equi-electric-field-intensity topographical line within each service zone. As a result, whenever the mobile station has moved into the particular region, it can identify the zone in which it is presently located. Thus, the hunting and selecting period at the mobile station can be sufficiently shortened by preventing the switching operations from extending to channels allocated to other zones. Incidentally, when the mobile station is located at a place where the electric field intensity of the signal received is higher than the lowest allowable value for the channel selection, but is lower than the above-mentioned predetermined electric field intensity needed for the zone-classified channel switching or, in other words, at a place near the boundary of two service zones, the switching operation must cover all channels assigned to those zones to select one idle channel.

BRIEF DESCRIPTION OF THE DRAWINGS

Now a channel switching device for mobile radio equipment of this invention will be described more in detail referring to the accompanying drawings in which.

DESCRIPTION OF THE PREFERRED EMBODIMENT

Figures 1, 2:
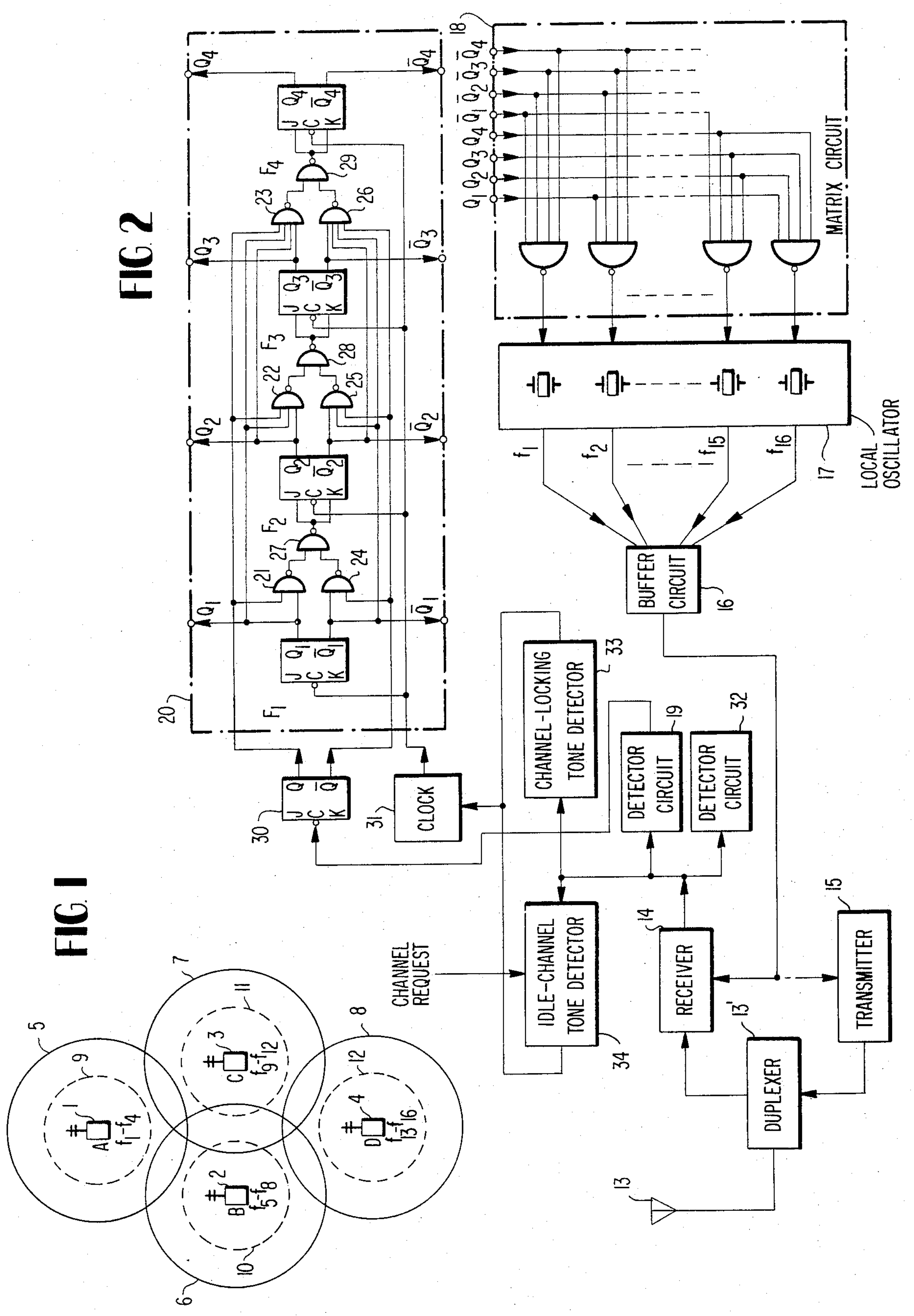
FIG. 1 is a schematic diagram of a service area composed of a plurality of zones.
FIG. 2 is a block diagram illustrating an example of a channel switching device used for a mobile radio unit according to this invention.

Referring now to FIG. 1, the service area is divided into a plurality of zones A, B, C, and D with four separate radio frequency channel groups $f_1$–$f_4$, $f_5$–$f_8$, $f_9$–$f_{12}$, and $f_{13}$–$f_{16}$ allocated, respectively, to these four zones. Communication is established between fixed stations 1, 2, 3, and 4 centrally located in these zones and mobile stations by using these allocated channels. Although not shown, each of these fixed stations is connected to a central station through cables. The suffixes of the channels $f_1$ through $f_{16}$ do not necessarily stand for the order of frequencies. The channel frequencies of any two adjacent zones, for example, are so allocated as not to be too close to one another. The solid-line circles 5 through 8 indicate the boundaries beyond which carrier waves of electric-field intensity sufficient to enable the scanning are not received.

According to the present invention, a mobile station which is in a certain zone performs the scanning only within the group of frequency channels allocated to the zone, as long as the carrier wave field intensity (or the signal-to-noise ratio) of such frequency channels is high enough to enable the scanning. Consequently, those dotted-line regions 9–12 which ensure the carrier wave field intensities high enough to ensure the within-the-zone channel hunting lie within the previously mentioned boundary lines 5 through 8. In practice, whether or not a vehicle is inside the dotted-line boundary can be judged by detecting the input level of a carrier wave received by the mobile ratio unit aboard the vehicle. It follows, therefore, that so long as the vehicle is within any of the dotted-line circles 9–12, the frequency channel hunting for channel selection is limited only to those frequencies allocated to the corresponding one of the zones 5–8. When the vehicle is in the regions outside the dotted-line circles 9 but inside the solid-line circles 5, for example, the scanning region is automatically expanded so that all the frequency channels allocated to the whole service area may be covered.

Referring to FIG. 2 showing an example of the channel switching device of this invention, reference numeral 13 denotes a transmitting and receiving antenna; 13', a duplexer; 14, a receiver; 15, a transmitter; 16, a buffer circuit; and 17, a local oscillator circuit. The local oscillator circuit 17 including a plurality of crystal resonators is controlled by a matrix circuit 18. Referring also to FIG. 1, the zone-classified channel signals serving, respectively, as the idle channel or the busy channel are simultaneously transmitted at frequencies $f_1$ through $f_{16}$ from the fixed stations of each zone. Therefore, the local oscillation signal corresponding to the channels $f_1$ through $f_{16}$ are available by the sequential switching control of the local oscillator circuit 17 and are fed to a frequency converter circuit of the receiver 14 through the buffer circuit 16. A received-signal of such an S/N ratio as exceeds a predetermined value is detected by a detector circuit 19 connected to the receiver 14. The detector circuit 19, similar to known squelch circuits, is employed for detecting the intermediate-frequency output and for developing an output code "1" indicating that the received signal level is larger than the predetermined level. When the received signal level is lower in the S/N ratio than the predetermined level, the circuit 19 is connected to a clock terminal C of an addition/subtraction switching circuit 30 consisting of a flip-flop circuit which changes state every time the output code of the detector circuit 19 is changed from 1 to "0". The output of the addition/subtraction switching circuit 30 is connected to a reversible counter 20, for counting the pulses from clock pulse generator 31 to develop outputs corresponding to the number of channels. In the reversible counter 20, flip-flop circuits $F_1$ through $F_4$ are connected in cascade through add control NAND gates 21, 22, and 23, subtract control NAND gates 24, 25, and 26, and NAND gates 27, 28, and 29, while a sequential clock pulse from a clock pulse generator 31 is applied with about 250 milliseconds interval to the clock terminal C of each of the flip-flop circuits $F_1$ through $F_4$. NAND gates 21 through 26 function as AND gates, while NAND gates 27, 28, and 29 function as OR gates. The outputs of the NAND gates 27, 28, and 29 are applied to both terminals J and K of the flip-flop circuits $F_2$ through $F_4$, respectively. The addition/subtraction switching circuit 30 and the flip-flop circuits $F_1$ to $F_4$ are formed, for example, in a single monolithic integrated circuit containing two identical complementary-symmetry J-K master-slave flip-flops as known in the prior art. In this circuit, when the positive pulse is applied to the "J" and "K" input terminals, the state of each of the master and slave flip-flops changes with the negative-going transition of the clock pulse. The output from the terminal Q of the circuit 30 is fed to the add control NAND gates 21, 22, and 23, whereas the output from the terminal $\overline{Q}$ is fed to the subtract control NAND gates 24, 25, and 26. When the Q output is 1 and the $\overline{Q}$ output is 0, the counter 20 performs the adding operation, and every time a clock pulse is developed from the clock pulse generator 31, the outputs of the flip-flop circuits $F_1$ through $F_4$ control the matrix circuit 18 so that the channels are switched in succession in the order of $f_1, f_2, f_3, \ldots$. When the $\overline{Q}$ output of the circuit 30 becomes 1 and the Q output 0, the counter 20 performs the subtracting operation. Thus, the channels are switched in succession in the order of $f_{16}, f_{15}, f_{14}, f_{13}, \ldots$. The matrix circuit 18 is composed of 16 NAND gates having a matrix which changes the binary output of the reversible counter 20 to a sexadecimal or base 16 output. In this circuit, the sexadecimal output derived from the NAND gates is capable of switching in an endless succession between the channels $f_1$ to $f_{16}$ of the oscillation frequencies of the local oscillator circuit 17. Incidentally, a detector circuit 32 connected to the output side of the receiver 14, together with the detector 19, is for detecting whether the received signal level is higher or lower than the minimum predetermined level.

It is assumed here that the mobile radio unit is, when the condition exists for establishing a communication link, located within the dotted-line circle 10 of zone B in FIG. 1 putting the counter 20 in the adding operation state. The receiver 14 is then switched sequentially in the order of $f_1, f_2, f_3, \ldots$. As soon as it reaches the channel $f_5$ allocated to the zone B, the output of the detector circuit 19 is changed from 0 to 1. Since there is a positive transition, addition/subtraction circuit 30 does not change state, and the counter 20 continues the adding operation so that the channels are switched in the order of $f_6$, $f_7$, and $f_8$. As soon as the channel is switched to the next $f_9$ channel, the output of the detector circuit 19 is turned from 1 to 0 since $f_9$ is one of the channels allocated to zone C, not to zone B. As a result, the state of the switching circuit 30 is reversed and the counter 20 begins the subtracting operation. Therefore, the channel is returned to $f_8$ by a succeeding pulse delivered from the clock pulse generator 31. In this case, although the output of the detector circuit 19 is turned to 1, the state of the switching circuit 30 remains as it is. Therefore, the counter 20 continues the subtracting operation, and the channels are switched in successsion in the order of $f_7$, $f_6$, and $f_5$. As soon as the $f_4$ channel is reached, the output of the detector circuit 19 is turned from 1 to 0 and the state of the switching circuit 30 is reversed again thereby to cause the counter 20 to resume the adding operation. As will be seen from the above, as long as the mobile radio unit is within the dotted-line circle 10 of the zone B, only the channels allocated to the zone B, $f_5$ through $f_8$, are scanned in succession to hunt the idle channels.

Description will now be given of the call-up of the mobile station from the fixed station. When the fixed station of the zone B calls the mobile station lying within its zone, for example, the channel $f_6$ in the fixed station should be changed to a channel-locking tone from the idle tone and then to a selective calling tone. This is detected by the channel-locking tone detector circuit 33 which inhibits the output of clock pulse generator 31 to stop the counting operation of counter 20. Thus, the mobile radio unit is locked and called at the position of the channel $f_6$, and then a transmission signal of the channel $f_6$ with an answer tone is transmitted to the fixed station from the antenna 13 through the transmitter 15. Thereafter, clock pulse generator 31 causes counter 20 to resume the counting operation. Thus, the connection for the communication is completed. Conversely, to call up the fixed station from the mobile station in the zone B, a channel request signal from the mobile unit handset enables the idle-channel tone detector 34 which, when an idle tone is detected, inhibits the output of clock pulse generator 31 to seize that channel. Then, the call tone is transmitted through its channel and the connection is made as before.

As described above, the connection to the idle channel can be accomplished within the selection period shorter than in the case of sequentially switching and scanning all the channels $f_1$ through $f_{16}$. Further, a high-quality communication becomes possible without utilizing the unreliable channels such as those provided by signals on channels coming from the fixed stations installed in the other zones.

When the vehicle is close to the boundaries of the zones 5 through 8, i.e., outside the dotted-line circles 9–12, the detector circuit 32 operates to sense the low level of the received signal. On the other hand, the detector circuit 19 holds the state of the code 0 at the output. Therefore, the counter 20 performs either the adding or subtracting operation so that switching and scanning operations are carried out for all the channels.

I claim:

1. In a mobile radio communication system covering a service area divided into a plurality of zones each having a fixed base station and each accommodating a plurality of mobile stations, each base station having a plurality of frequency-divided communication channels exclusively assigned to it, the improvement in said mobile stations comprising:

a receiver and a transmitter having a common local oscillator input, detecting means responsive to a signal received by said receiver for comparing said received signal to a predetermined threshold, channel switching means responsive to said detecting means for controllably switching between channels assigned to a zone in which said mobile station is located when said received signal exceeds said threshold and for controllably switching between all the channels in the service area when said received signal is below said threshold, said channel switching means including switched local oscillator means for supplying local oscillation frequencies for all the channels in the service area to said common local oscillator input, said switched local oscillator means having a plurality of crystal resonators, and matrix means for selectively energizing one of said crystal resonators, and counter means for selectively controlling said matrix means, said counter means including a reversible counter, a clock pulse source for incrementing or decrementing said reversible counter, and addition/subtraction control means responsive to said detecting means for controlling said reversible counter to add or subtract pulses from said clock pulse source.

2. The improvement as recited in claim 1 wherein said reversible counter is a binary counter and said matrix means converts the binary count accomulated in said reversible counter to an output corresponding to a specific channel.

* * * * *